United States Patent
Brown et al.

(10) Patent No.: US 7,080,273 B2
(45) Date of Patent: Jul. 18, 2006

(54) SEQUENCING POWER SUPPLIES ON DAUGHTER BOARDS

(75) Inventors: David Alan Brown, Carp (CA); Muge Guher, Ottawa (CA)

(73) Assignee: Potentia Semiconductor, Inc., Wilmington, DE (US)

( * ) Notice: Subject to any disclaimer, the term of this patent is extended or adjusted under 35 U.S.C. 154(b) by 473 days.

(21) Appl. No.: 10/428,136

(22) Filed: May 2, 2003

(65) Prior Publication Data
US 2004/0217651 A1 Nov. 4, 2004

(51) Int. Cl.
G06F 1/26 (2006.01)
G06F 1/30 (2006.01)

(52) U.S. Cl. .................................. 713/330; 307/31
(58) Field of Classification Search ............. 713/330; 307/31
See application file for complete search history.

(56) References Cited

U.S. PATENT DOCUMENTS

| | | | | |
|---|---|---|---|---|
| 4,593,349 A | * | 6/1986 | Chase et al. | 713/330 |
| 4,674,031 A | * | 6/1987 | Siska, Jr. | 700/79 |
| 5,559,376 A | | 9/1996 | Tachikawa | 307/86 |
| 6,333,650 B1 | * | 12/2001 | Amin et al. | 327/143 |
| 6,429,706 B1 | * | 8/2002 | Amin et al. | 327/143 |
| 6,448,672 B1 | | 9/2002 | Voegeli et al. | 307/52 |
| 6,531,791 B1 | | 3/2003 | Ekelund et al. | 307/66 |
| 6,615,360 B1 | * | 9/2003 | Amini et al. | 713/330 |
| 6,651,178 B1 | * | 11/2003 | Voegeli et al. | 713/300 |
| 6,792,553 B1 | * | 9/2004 | Mar et al. | 713/330 |
| 2003/0057779 A1 | | 3/2003 | Reichard | 307/147 |
| 2004/0215991 A1 | * | 10/2004 | McAfee et al. | 713/324 |

OTHER PUBLICATIONS

"Modular Solid-State Power Sequencing"; IBM Technical Disclosure Bulletin; XP-002292120; vol. 15; No. 12; May 1973; pp. 3697-3699.*

* cited by examiner

Primary Examiner—Brian Sircus
Assistant Examiner—Hal I. Kaplan

(57) ABSTRACT

Power supplies are enabled and disabled in sequence by a controller in dependence upon output voltages of the power supplies monitored by the controller. The controller allows proper sequencing of the power supplies when one or more of them is provided on a daughter board, when this is not connected to a mother board on which the controller is provided, by storing information as to any power supply provided on the daughter board, detecting when the daughter board is not connected to the mother board, and in that case enabling the power supplies in sequence independently of any monitored output voltage of such a power supply on the daughter board.

18 Claims, 2 Drawing Sheets

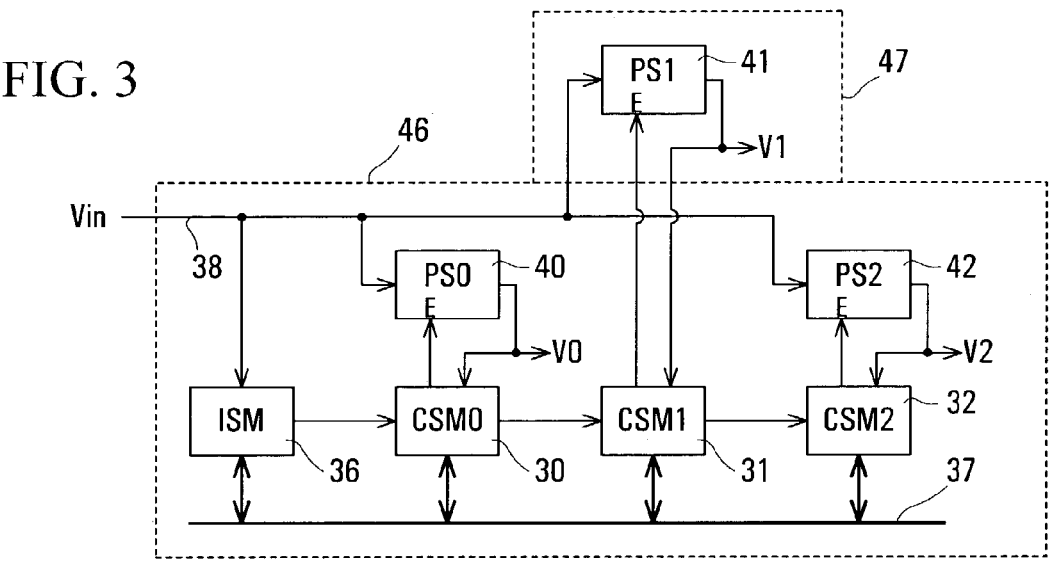
FIG. 3
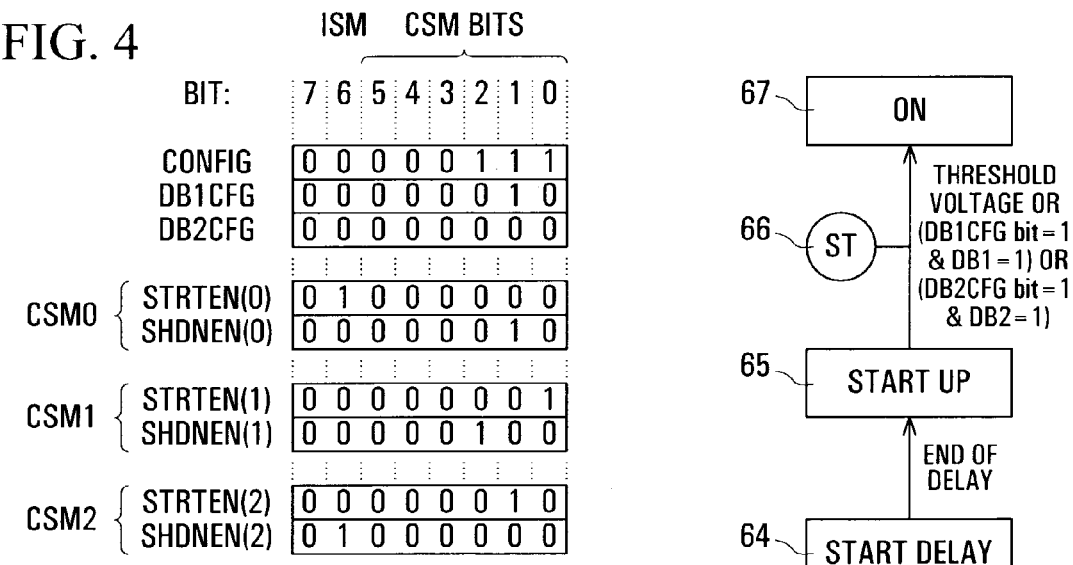
FIG. 4
FIG. 6
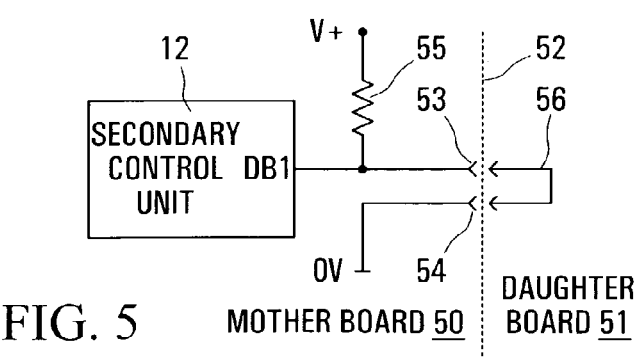
FIG. 5

SEQUENCING POWER SUPPLIES ON DAUGHTER BOARDS

This invention relates to sequencing power supplies on daughter boards.

REFERENCE TO RELATED APPLICATIONS

Reference is directed to the following copending United States Patent Applications filed simultaneously herewith, the entire disclosure of each of which is hereby incorporated herein by reference:

"Power Supply Controller", R. Orr et al., (79115–8, PP010);

"Sequencing Power Supplies", D. Brown et al., (79115–20, PP011).

BACKGROUND

The related applications relate to a power supply controller which can be used for controlling a plurality of isolating power supplies, such as switch mode power supplies or DC power converters, for providing controlled electrical power to loads. For example, the power supplies may provide different supply voltages to various electrical circuits on a circuit card on which the power supply controller is also provided.

In such a power supply controller, separate IC (integrated circuit) control units can be provided on the primary and secondary sides of a transformer that serves to maintain an electrical isolation barrier between input and output sides of the isolating power supplies. The transformer conveniently provides for signal coupling in both directions between the primary and secondary control units, and also for power transfer from its primary to its secondary side to supply operating power to the secondary control unit and any related circuits (for example, a non-volatile memory) of the power supply controller on the secondary side of the transformer.

As described in the related applications, the power supply controller and the signal coupling within it are arranged for controlling up to six power supplies. To this end, each of the primary and secondary control units has six converter state machines (CSMs), one for each of up to six controlled power supplies, as well as an input state machine (ISM) relating to an input or supply voltage.

The power supplies are sequenced, i.e. enabled in a predetermined sequence, and disabled in a predetermined, typically reverse, sequence, in accordance with conditions monitored by the power supply controller. The monitored conditions include, for example, output voltages produced by the respective power supplies, and an input voltage of a power source which powers all of the power supplies and the power supply controller. Thus, for example, enabling of each power supply on power-up of the circuit card can be dependent upon the input voltage, or upon a monitored output voltage of a prior-enabled power supply, exceeding a threshold voltage.

The related application by D. Brown et al. discloses arrangements of power supplies that can provide relatively arbitrary sequence topologies. However, there remains a potential problem where the power supply controller is provided on a main circuit card, referred to herein as a mother board, and one or more of the controlled power supplies is provided on a subsidiary circuit card, typically mounted on the mother board and referred to herein as a daughter board. In such a situation it may be desirable, especially for testing purposes, to operate circuits on the mother board without the daughter board being present, but the consequent absence of the power supplies on the daughter board means that the power supply controller will not detect monitored output voltages of such power supplies exceeding the respective thresholds.

Accordingly, there is a need to avoid this potential problem in sequencing one or more power supplies which may be provided on a daughter board.

SUMMARY OF THE INVENTION

According to one aspect, this invention provides a method of controlling a plurality of power supplies, comprising the steps of: controlling the plurality of power supplies in a predetermined sequence using a power supply controller on a mother board, the control being dependent upon monitored output voltages of the power supplies; providing at least one of the power supplies on a daughter board which can be connected to the mother board; detecting whether or not the daughter board is connected to the mother board; and over-riding the dependence of the control on a monitored output voltage of a power supply on the daughter board in response to detecting that the daughter board is not connected to the mother board.

The step of over-riding can comprise identifying in the power supply controller each power supply on the daughter board, and over-riding the dependence of the control on the monitored output voltage of each identified power supply on the daughter board in response to detecting that the daughter board is not connected to the mother board. For example, this step can comprise storing in a respective bit position of a configuration register an indication of each of the plurality of power supplies, and storing in a corresponding bit position of another register an indication of each power supply provided on the daughter board.

The step of controlling the plurality of power supplies in a predetermined sequence can comprise enabling the power supplies in a power-up sequence and/or disabling the power supplies in a power-down sequence.

The method can comprise the step of storing, in a respective register for each of the plurality of power supplies, an indication in a respective bit position of a preceding power supply in the power-up and/or power-down sequence, the respective bit positions corresponding to the respective bit positions of the configuration register.

According to another aspect, this invention provides a method of enabling a plurality of power supplies in a predetermined power-up sequence, comprising the steps of: providing on a mother board a power supply controller for monitoring output voltages of the power supplies and for enabling the power supplies in said power-up sequence in dependence upon the monitored output voltages; providing at least one of the power supplies on a daughter board which can be connected to the mother board; detecting whether or not the daughter board is connected to the mother board; and in response to detecting that the daughter board is not connected to the mother board, enabling the power supplies in said power-up sequence independently of a monitored output voltage of a power supply on the daughter board.

A further aspect of this invention provides a method of enabling a plurality of power supplies in a predetermined power-up sequence, comprising the steps of: providing on a mother board a power supply controller for monitoring output voltages of the power supplies; providing at least one of the power supplies on a daughter board which can be connected to the mother board; and detecting whether or not the daughter board is connected to the mother board; wherein the power supply controller enables the power supplies in said power-up sequence in dependence upon the monitored output voltages of power supplies on the mother board, and in dependence upon the monitored output voltages of power supplies on the daughter board only in response to detecting that the daughter board is connected to the mother board.

The invention also provides a circuit arrangement comprising: a mother board; a daughter board which can be connected to the mother board; a plurality of power supplies on said boards, at least one of the power supplies being provided on the daughter board; a power supply controller for carrying out the method recited above, the power supply controller comprising at least one control unit for monitoring said output voltages and for enabling each of said power supplies; and a detection circuit coupled to an input of the control unit for detecting whether or not the daughter board is connected to the mother board.

BRIEF DESCRIPTION OF THE DRAWINGS

The invention will be further understood from the following description by way of example with reference to the accompanying drawings, in which:

FIG. 3 illustrates a sequence topology of converter state machines (CSMs) in the power supply controller of FIG. 1 corresponding to the linear sequencing of FIG. 2, with controlled power supplies on mother and daughter boards;

FIG. 4 illustrates contents of registers of the power supply controller corresponding to the sequence topology of FIG. 3, in accordance with an embodiment of the invention;

FIG. 5 schematically illustrates connections between the mother and daughter boards for detecting presence of the daughter board, in an embodiment of the invention; and FIG. 6 shows part of a state diagram for each of the CSMs, in accordance with an embodiment of the invention.

DETAILED DESCRIPTION

Figure 1:
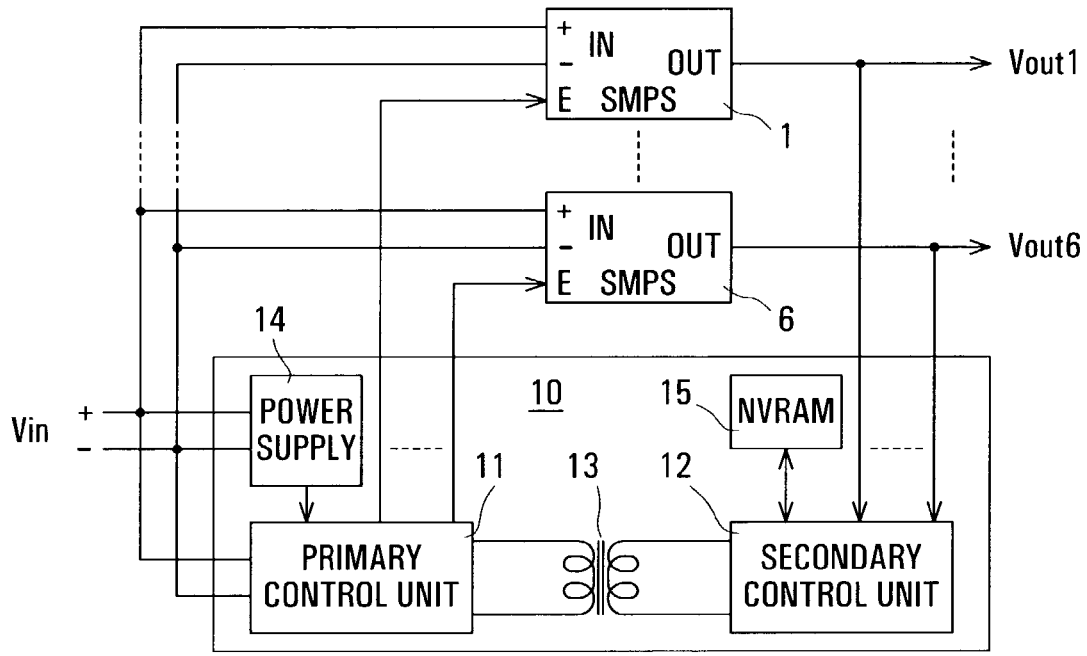
FIG. 1 shows a block diagram of a power supply controller and a plurality of controlled power supplies.

Referring to FIG. 1, a power supply controller 10 is illustrated for controlling a plurality of isolating power supplies, for example up to six power supplies two of which are represented in FIG. 1 by switched mode power supplies (SMPS) 1 and 6, others being indicated by dashed lines. The power supply controller 10 comprises two control units 11 and 12, referred to as primary and secondary control units respectively, which are isolated from one another and between which signals are coupled in both directions by a transformer 13. The power supply controller 10 also comprises a power supply 14 for the primary control unit 11, and a non-volatile memory (NVRAM) 15 coupled to the secondary control unit 12.

Each of the power supplies 1, . . . 6 has an enable input E and inputs + and − for a source voltage Vin on its primary side, and an isolated output OUT on its secondary side providing a respective output voltage Vout1, . . . Vout6. These output voltages are monitored by the secondary control unit 12 by connections to the output paths as illustrated, and the primary control unit 11 controls the power supplies 1, . . . 6 by connections to the respective enable inputs E. The isolation provided by the transformer 13 maintains the isolation of the power supplies 1, . . . 6 between their primary and secondary sides. The source voltage Vin is also supplied to the power supply 14, which provides a regulated supply voltage to the primary control unit 11, and is monitored by the primary control unit 11 as further described below.

A supply voltage for the secondary control unit 12 and the NVRAM 15 can be derived from a separate isolating power supply (not shown) from the primary side, but is preferably derived from the secondary side of the transformer 13 by rectifying signals coupled from the primary control unit and driven with a sufficient current drive to provide this secondary supply voltage, as described in the related application by R. Orr et al. The NVRAM 15 serves to store information used in operation of the power supply controller 10, this information being transferred to shadow registers in the control units 11 and 12 on power-up of the power supply controller 10.

By way of example, the power supply controller 10 and the controlled power supplies 1, . . . 6 may all be provided on a circuit card which also includes electrical circuits constituting loads to be powered by the power supplies. In use, the circuit card is inserted in an equipment slot and thereby connected to a backplane which provides + and − connections to a power source providing the voltage source Vin, which is for example a nominally 48 volt source.

Although not shown in FIG. 1, the control units 11 and 12 can include further connections to the power supplies 1, . . . 6, for example for trimming their output voltages and/or enabling the power supplies via secondary side enable inputs.

All of the components 11 to 15 of the power supply controller 10 are desirably integrated into a single package, in which each of the control units 11 and 12 conveniently comprises an application-specific IC (ASIC).

Each of the control units 11 and 12 includes six converter state machines (CSMs), referred to as CSM0 to CSM5, each provided for a respective one of the six controlled power supplies 1, . . . 6, and an input state machine (ISM) in respect of the source voltage Vin, between which signals are exchanged by being broadcast on a shared bus. This bus is extended between the primary and secondary control units 11 and 12 through the signal coupling in both directions via the transformer 13. Via these communications, synchronism is maintained between the corresponding state machines in the two control units 11 and 12.

Predominantly, states are determined by the CSMs in the secondary control unit 12, where the monitoring of the output voltages of the corresponding power supplies takes place, and signals from these CSMs are communicated via the bus and the transformer 13 to maintain synchronism of the respective CSMs in the primary control unit 11. For example, CSM0 in each of the control units 11 and 12 may be allocated to the power supply 1. While this power supply is disabled, the CSM0 in the secondary control unit 12 may determine that it is to be enabled, and can communicate this via the bus and the transformer 13 to the CSM0 in the primary control unit 13, which enables the power supply 1 via the latter's enable input E and acknowledges the new state so that the CSM0 in both control units remain synchronized as to the state of the power supply 1.

In view of this synchronism of the CSMs in the control units 11 and 12, and similarly of the ISMs in these control units, in the following description no distinction is made between the corresponding state machines of the two control units 11 and 12.

By way of example, the bus providing for communications among the state machines can be an 8-bit bus which is daisy-chained through all of the state machines and operated in a tdm (time division multiplex) manner with 8 time slots each allocated for communications from a respective state machine to the bus. Each state machine drives the bus with its own information during its allocated time slot, and in the other time slots can receive the information of the other state machines.

When the source or input voltage Vin is initially connected, a power-up process is followed in which the power supply controller 10 disables all of the controlled power supplies 1, . . . 6, establishes power transfer to the secondary control unit 12 and signal communications between the control units 11 and 12 via die transformer 13, and downloads information stored in the NVRAM 15 to shadow registers in the control units 12 and (via the transformer 13) 11. This downloaded information includes information, for example as further described below, for determining the operation of the power supply controller 10, and in particular for sequencing the controlled power supplies 1, . . . 6 so that they are powered up and down in a desired and controlled manner.

Figure 2:
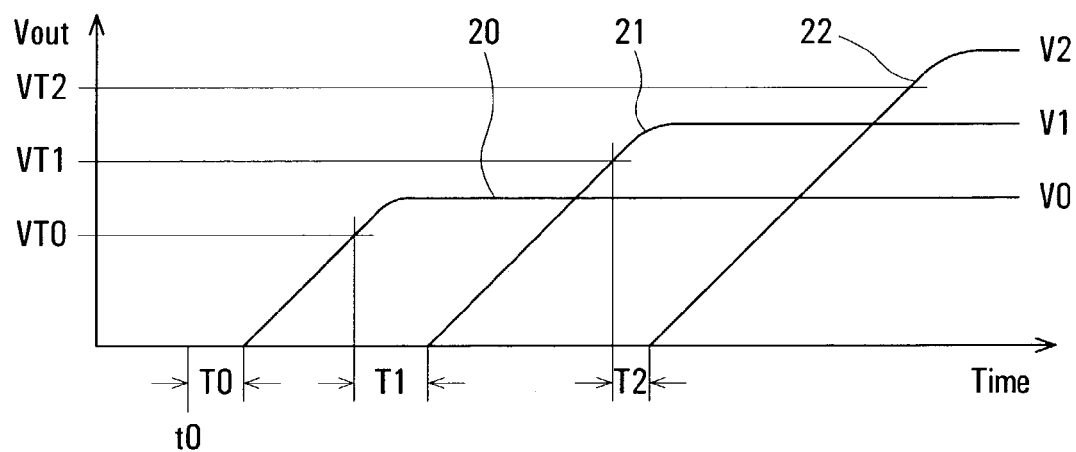
FIG. 2 is a diagram illustrating a linear sequencing of three power supplies controlled by the power supply controller of FIG. 1.

By way of example, FIG. 2 illustrates, in a graph of output voltage Vout as a function of time, a power-up sequence for three controlled power supplies, assumed to be controlled by CSM0, CSM1, and CSM2 respectively in this sequence and in accordance with time delays T0, T1, and T2 respectively and start-up threshold voltages VT0, VT1, and VT2 respectively. These time delays and threshold voltages are part of the information downloaded from the NVRAM 15. The output voltages of the controlled power supplies, ultimately V0, V1, and V2 respectively, are represented by lines 20, 21, and 22 respectively.

In FIG. 2, it is assumed that the ISM determines that all of the applicable conditions for initiating a power-up sequence are satisfied at a time t0, at which time the ISM broadcasts a start message as further described below. The initial conditions can include, for example, a threshold voltage and related period which must be exceeded by the input voltage Vin, information and a period to ensure that the circuit card on which the power supply controller is provided is inserted and seated in a correct equipment slot, a period which must have expired following any previous fault causing a power-down of the controlled power supplies, and receipt of messages from the CSMs to ensure that all of the controlled power supply output voltages are below respective thresholds for restart.

In response to the start message from the ISM at the time t0, CSM0 for the first controlled power supply in the power-up sequence times its start-up delay T0 and then enables its power supply, the output voltage of which accordingly rises as shown by the line 20 to cross its threshold voltage VT0, at which time CSM0 broadcasts a start message.

In response to this start message from CMS0, CSM1 for the second controlled power supply in the power-up sequence times its start-up delay T1 and then enables its power supply, the output voltage of which accordingly rises as shown by the line 21 to cross its threshold voltage VT1, at which time CSM1 broadcasts a start message. Similarly, in response to this start message from CMS1, CSM2 for the third controlled power supply in the power-up sequence times its start-up delay T2 and then enables its power supply, the output voltage of which accordingly rises as shown by the line 22 to cross its threshold voltage VT2, at which time CSM2 broadcasts a start message.

Thus FIG. 2 represents a linear power-up sequence. FIG. 3 illustrates a corresponding sequence topology of the three CSMs CMS0 to CMS2, referenced 30 to 32 respectively, and the ISM, referenced 36, in which this linear power-up sequence is represented by arrowed lines between these state machines. FIG. 3 also represents the bus, via which messages are communicated among the state machines, by a bold line 37. In addition, FIG. 3 illustrates a line 38 via which the input voltage Vin is supplied to the power supplies, and to the ISM 36 to be monitored thereby, and power supplies PS0 to PS2, referenced 40 to 42, each with its enable input E controlled by the respective CSM 30 to 32 and producing a respective output voltage V0 to V2 which is monitored by the respective CSM 30 to 32.

Although FIGS. 2 and 3 relate to a power-up sequence, it can be appreciated that in a similar manner a topology for a power-down sequence, typically the reverse of the power-up sequence, and a topology for a fault shut-down sequence in the event of a fault condition, can be represented. Although a linear power-up sequence is illustrated and described here, it can also be appreciated that the sequence topology can also include independent, divergent, and/or convergent paths as described in the related application by D. Brown et al.

For any such sequencing, in the power supply controller 10 in an embodiment of the invention, a shadow configuration register is provided for information representing which of the six CSMs has an associated controlled power supply, and each of the CSMs has three shadow registers for information representing the sequencing of the respective power supply for power-up, power-down, and fault shut-down, respectively. As this information is only used by the secondary control unit 12, these registers need only be provided in the secondary control unit, the information being stored in and downloaded from the NVRAM 15 as described above.

FIG. 4 illustrates an example of some of these registers and their contents for the power-up sequence topology of FIGS. 2 and 3. In FIG. 4, the configuration register is denoted CONFIG, and for each of the CSMs CSM0 to CSM2 FIG. 4 shows a register denoted STRTEN(n) for start or power-up enabling, and a register denoted SHDNEN(n) for power-down or shut-down enabling, where in each case n is constituted by a number, in this example 0 to 2, for CSM0 to CSM2 respectively. FIG. 4 also shows configuration registers DB1CFG and DB2CFG which are further described below.

FIG. 4 shows each register as having eight bits numbered 0 to 7, bits 0 to 5 identifying the CSMs CSM0 to CSM5 respectively. Except in the register CONFIG, bit 6 identifies the ISM, and bit 7 is unused as described here. Bits 6 and 7 of the register CONFIG are zero to represent that the power supply controller 10 is a stand-alone controller. Each of bits 0 to 2 of the register CONFIG is 1 to indicate that the respective CSM, CSM0 to CSM2, controls a respective power supply, as shown in FIG. 3, and each of bits 3 to 5 of the register CONFIG is 0 to indicate that in this example the respective CSMs CSM3 to CSM5 do not control power supplies.

A 1 bit in each register STRTEN(n) indicates a dependency of the respective CSM, for power-up of its controlled power supply, on a start message from another state machine identified by the bit position. Similarly, a 1 bit in each register SHDNEN(n) indicates a dependency of the respective CSM, for shut-down of its controlled power supply, on a shut-down message from another state machine identified by the bit position. If any of these registers contains 1 bits in two or more bit positions, an AND function applies; i.e.

the respective message is required from each of the state machines identified by these 1 bits.

For the linear power-up sequence of FIGS. 2 and 3, as shown in FIG. 4 the register STRTEN(0) has a 1 at bit 6 indicating that CSM0 is dependent upon a start message from the ISM, the register STRTEN(1) has a 1 at bit 0 indicating that CSM1 is dependent upon a start message from CSM0, and the register STRTEN(2) has a 1 at bit 1 indicating that CSM2 is dependent upon a start message from CSM1.

For a reversed linear power-down sequence, as shown in FIG. 4 the register SHDNEN(2) has a 1 at bit 6 indicating that CSM2 is dependent upon a shut-down message from the ISM, the register SHDNEN(1) has a 1 at bit 2 indicating that CSM1 is dependent upon a shut-down message from CSM2, and the register SHDNEN(0) has a 1 at bit 1 indicating that CSM0 is dependent upon a shut-down message from CSM1. The shut-down process, and the fault shut-down process and associated registers, are further described in the related application by D. Brown et al.

A potential problem with this power supply sequencing can arise in the event that at least one of the controlled power supplies is provided on a daughter board which may not always be connected to a mother board on which the power supply controller 10 is provided. This is illustrated in FIG. 3 by a dashed line box 46 representing a mother board-on which the power supply controller 10 and the PS0 and PS2 power supplies 40 and 42 are provided, and a dashed line box 47 representing a daughter board on which the PS1 power supply 41 is provided.

It can be appreciated that, in this example, for power-up in the absence of the daughter board the PS0 power supply 40 will be enabled by CSM0 30 in response to a start message from the ISM 36, and a resulting start message from CSM0 will cause CMS1 31 to produce an enable signal, but the voltage V1 will not be produced because the PS1 41 is not present. Consequently, CSM1 31 will not produce a start message, CSM2 will not produce an enable signal, and PS2 42 will not be enabled.

In order to avoid this problem, the power supply controller 10 also contains the registers DB1CFG and DB2CFG as shown in FIG. 4, each for a respective one of potentially two daughter boards that may be connected to the mother board and on each of which one or more of the controlled power supplies may be provided. In each of these daughter board configuration registers, in which bits 6 and 7 are not used in this example, a 1 bit in any bit position represents that the controlled power supply identified by this bit position is provided on the respective daughter board. Thus for the example of FIG. 3, the register DB1CFG contains a 1 at bit 1 to indicate that the PS1 power supply 41 is provided on a first daughter board, and the bits of the register DB2CFG are all 0 to indicate that no controlled power supply is provided on any second daughter board.

In order for the power supply controller 10 to respond properly to the monitored output voltage of the PS1 power supply when the daughter board carrying this power supply is present, it must determine whether or not the daughter board is present. To this end, as shown in FIG. 5 the secondary control unit 12 includes an input DB1 which is used to sense the presence of the first daughter board, and another input DB2 (not shown) and a similar arrangement as described below which is used to sense the presence of a possible second daughter board (not shown).

As shown in FIG. 5, parts of the mother board 50 are illustrated to the left, and parts of the daughter board 51 are illustrated to the right, of a vertical dashed line 52 which represents a connection interface of the daughter board to the mother board. This connection interface 52 includes connectors 53 and 54 on the mother board 50, connected respectively to the input DB1 and to a 0V or common line on the mother board. A pull-up resistor 55 (which can be an internal pull-up of the secondary control unit 12) is connected between the input DB1 and a positive supply voltage V+ on the motherboard. The daughter board includes a connection link 56 which interconnects the connectors 53 and 54 when the daughter board 51 is connected to the mother board 50. Other connections between the daughter board 51 and the mother board 50 are not shown in FIG. 5.

Consequently, in the absence of the daughter board 51 the input DB1 is pulled up to a positive voltage corresponding to a logic 1, and when the daughter board 51 is connected to the mother board 50 the input DB1 is at 0V corresponding to a logic 0.

FIG. 6 shows part of a state diagram for each of the CSMs, in accordance with an embodiment of the invention. From an OFF state 63, in response to receiving from the bus each start message ST, from the ISM or another CSM, that it requires according to the 1 bit(s) in its register STRTEN as described above, a CSM transitions to a START DELAY state 64 in which it times the start-up delay as described above. This start-up delay may be zero. At the end of this start-up delay the CSM transitions to a START UP state 65 in which it enables its controlled power supply.

In the state 65, the CSM is responsive to any of three situations, i.e. an OR combination, to broadcast a start (ST) message 66 and transition to an ON state 67. A first one of these three situations occurs when the monitored output voltage of the power supply controlled by this CSM exceeds the threshold voltage as described above with reference to FIG. 2; this is a normal power-up situation. A second one of these three situations occurs when the power supply controlled by this CSM is provided on the first daughter board, the bit identifying this CSM in the register DB1CFG accordingly being 1, and this first daughter board is not present so that the input DB1 is a logic 1. This is the situation for the PS1 power supply in FIG. 3, and hence for CSM1, when the daughter board 51 is not connected to the mother board 50. The third of these situations is similar to the second, except that it relates to a second daughter board, the register DB2CFG, and the input DB2.

Consequently, each CSM broadcasts its start message ST 66 to the bus, to enable a transition from the OFF state 63 to the START DELAY state 64 of any other CSM that is dependent upon this start message as determined by its STRTEN register, either in response to the output voltage of its controlled power supply exceeding the respective threshold voltage or, if this controlled power supply is on a daughter board as represented by the register DB1CFG or DB2CFG, in the absence of that daughter board as detected via the input DB1 or DB2 respectively.

Thus in the example of FIGS. 3 to 5, if the first daughter board 51 on which the PS1 power supply 41 is provided is not connected to the mother board 50, CSM1 produces its start message ST immediately after reaching the START UP state 65 at the end of its start-up delay period, and CSM2 responds to this start message broadcast on the bus 37 to transition from its OFF state 63 to its START DELAY state 64 even though there is no output voltage V1. This permits, for example, testing of the mother board 50, including the sequencing of its power supplies 40 and 42, in the absence of the daughter board 51.

As represented in FIG. 4 by the contents of the registers SHDNEN(n), the shut-down sequence includes similar dependencies of each CSM upon shut-down messages of other state machines. As described more fully in the related application by D. Brown et al., a CSM can produce its shut-down message when the output voltage of its controlled power supply falls below a threshold voltage. In embodiments of this invention in which one or more power supplies can be provided on one or more daughter boards which may not be present, in this case, similarly to the OR combination as described above for the power-up sequence, shut-down for each CSM can be made dependent upon an OR combination of the respective other state machine shut-down message(s) with the daughter board configuration and daughter board detection information as described above.

Thus for a shut-down sequence in the example of FIGS. 3 to 5, CSM1 starts a shut-down delay period in response to a shut-down message from CSM2 (bit 2 of SJ-TDNFEN(1) is 1). If the daughter board 51 is present (DB1 is 0), then CSM1 disables the PS1 power supply 41 at the end of this shut-down delay period, and produces its shut-down message when the monitored output voltage V1 of the PS1 power supply 41 ihlls below a threshold voltage. If the daughter board 51 is not connected to the mother board 50, in accordance with bit 1 of die register DB1CFG being 1 and the input DB1 being 1, CSM1 produces its shut-down message immediately after the end of its shut-down delay period. Thus in either ease this shut-down message is produced to enable shut-down by CSMO, which is dependent upon this shut-down message from CMS1 because bit 1 of the register SHDNEN(0) is 1.

Although the above description relates to linear power-up and shut-down sequences, it can be appreciated that the configuration and sequencing information for the registers, stored in the NVRAM 15 and downloaded to the control units 11 (to the extent that the control unit 11 requires this information for operation of the power supply controller) and 12 on power-up of the power supply controller 10, can be to configure the power supply controller 10 for operation in any desired manner.

Although in the above description the ISM and CSMs in each of the first and second control units are described in the form of state machines in an ASIC, it can be appreciated that these can be implemented in any other desired manner, for example as multiplexed processes of a microcontroller. In addition, it can be appreciated that the functions of the ISM and the CSMs can be provided in a single control unit, rather than in two synchronized control units as described above.

Thus although particular embodiments of the invention and examples have been described above in detail, it can be appreciated that numerous modifications, variations, and adaptations may be made without departing from the scope of the invention as defined in the claims.

The invention claimed is:

1. A method of controlling a plurality of power supplies, comprising the steps of:
controlling the plurality of power supplies in a predetermined sequence using a power supply controller on a mother board, the control being dependent upon output voltages of the power supplies monitored by the power supply controller;
providing at least one of the power supplies on a daughter board which can be connected to the mother board;
detecting whether or not the daughter board is connected to the mother board thereby to determine whether or not said at least one of the power supplies is present; and
over-riding the dependence of the control on a monitored output voltage of a power supply on the daughter board in response to detecting that the daughter board is not connected to the mother board.

2. A method as claimed in claim 1 wherein the step of over-riding the dependence of the control on a monitored output voltage of a power supply on the daughter board comprises identifying in the power supply controller each power supply on the daughter board, and over-riding the dependence of the control on the monitored output voltage of each identified power supply on the daughter board in response to detecting that the daughter board is not connected to the mother board.

3. A method as claimed in claim 1 wherein the step of over-riding the dependence of the control on a monitored output voltage of a power supply on the daughter board comprises storing in a respective bit position of a configuration register an indication of each of the plurality of power supplies, and storing in a corresponding bit position of another register an indication of each power supply provided on the daughter board.

4. A method as claimed in claim 1 wherein the step of detecting whether or not the daughter board is connected to the mater board comprises biasing an input of the power supply controller to a first logic level when the daughter board is not connected to the mother board, and supplying a second logic level to said input via a connection between the mother board and the daughter board when the daughter board is connected to the mother board.

5. A method as claimed in claim 1 wherein the step of controlling the plurality of power supplies in a predetermined sequence comprises enabling the power supplies in a power-up sequence.

6. A method as claimed in claim 1 wherein the step of controlling the plurality of power supplies in a predetermined sequence comprises disabling the power supplies in a power-down sequence.

7. A method as claimed in claim 3 wherein the step of controlling the plurality of power supplies in a predetermined sequence comprises enabling the power supplies in a power-up sequence.

8. A method as claimed in claim 7 and comprising the step of storing, in a respective register for each of the plurality of power supplies, an indication in a respective bit position of a preceding power supply in the power-up sequence, the respective bit positions corresponding to the respective bit positions of the configuration register.

9. A method as claimed in claim 3 wherein the step of controlling the plurality of power supplies in a predetermined sequence comprises disabling the power supplies in a power-down sequence.

10. A method as claimed in claim 9 and comprising the step of storing, in a respective register for each of the plurality of power supplies, an indication in a respective bit position of a preceding power supply in the power-down sequence, the respective bit positions corresponding to the respective bit positions of the configuration register.

11. A method of enabling a plurality of power supplies in a predetermined power-up sequence, comprising the steps of:
providing on a mother board a power supply controller for monitoring output voltages of the power supplies and for enabling the power supplies in said power-up sequence in dependence upon the monitored output voltages;
providing at least one of the power supplies on a daughter board which can be connected to the mother board;

detecting whether or not the daughter board is connected to the mother board thereby determine whether or not said at least one of the power supplies is present; and in response to detecting that the daughter board is not connected to the mother board, enabling the power supplies in said power-up sequence independently of a monitored output voltage of a power supply on the daughter board.

12. A method as claimed in claim 11 wherein the step of enabling the power supplies comprises storing in a respective bit position of a configuration register an indication of each of the plurality of power supplies, storing in a corresponding bit position of another register an indication of each power supply provided on the daughter board, and storing, in a corresponding bit position of a respective register for each of the plurality of power supplies, an indication of a preceding power supply in the power-up sequence.

13. A method as claimed in claim 11 wherein the step of detecting whether or not the daughter board is connected to the mother board comprises biasing an input of the power supply controller to a first logic level when the daughter board is not connected to the mother board, and supplying a second logic level to said input via a connection between the mother board and the daughter board when the daughter board is connected to the mother board.

14. A method as claimed in claim 11 and further comprising the step of disabling the plurality of power supplies in a predetermined power-down sequence, the step of disabling comprising the steps of:

disabling the power supplies in said power-down sequence in dependence upon the monitored output voltages; and in response to detecting that the daughter board is not connected to the mother board, disabling the power supplies in said power-down sequence independently of a monitored output voltage of a power supply on the daughter board.

15. A method of enabling a plurality of power supplies in a predetermined power-up sequence, comprising the steps of:

providing on a mother board a power supply controller for monitoring output voltages of the power supplies;

providing at least one of the power supplies on a daughter board which can be connected to the mother board; and detecting whether or not the daughter board is connected to the mother board thereby to determine whether or not said at least one of the power supplies is present;

wherein the power supply controller enables the power supplies in said power-up sequence in dependence upon the monitored output voltages of power supplies on the mother board, and in dependence upon the monitored output voltages of power supplies on the daughter board only in response to detecting that the daughter board is connected to the mother board.

16. A method as claimed in claim 15 and further comprising the step of disabling the plurality of power supplies in a predetermined power-down sequence, wherein the power supply controller disables the power supplies in said power-down sequence in dependence upon the monitored output voltages of power supplies on the mother board, and in dependence upon the monitored output voltages of power supplies on the daughter hoard only in response to detecting that the daughter board is connected to the mother board.

17. A method as claimed in claim 16 wherein the power-down sequence is opposite to the power-up sequence.

18. A circuit arrangement comprising:

a mother board;

a daughter board which can be connected to the mother board;

a plurality of power supplies on said boards, at least one of the power supplies being provided on the daughter board;

a power supply controller for carrying out the method of claim 11, the power supply controller comprising at least one control unit for monitoring said output voltages and for enabling each of said power supplies; and a detection circuit coupled to an input of the control unit for detecting whether or not the daughter board is connected to the mother board.

* * * * *